United States Patent [19]

Ottenstein

[11] Patent Number: 4,789,810

[45] Date of Patent: Dec. 6, 1988

[54] PHOTOCELL TEMPERATURE SWITCH FOR HIGH INTENSITY DISCHARGE LAMP FIXTURE

[75] Inventor: Sidney A. Ottenstein, Spring, Tex.

[73] Assignee: Innovative Controls, Inc., Houston, Tex.

[21] Appl. No.: 65,269

[22] Filed: Jun. 22, 1987

[51] Int. Cl.[4] .......................................... H01J 29/07
[52] U.S. Cl. ................................... 315/308; 315/309; 315/118; 315/155
[58] Field of Search ................ 315/118, 155, 308, 309

[56] References Cited

U.S. PATENT DOCUMENTS

| | | | |
|---|---|---|---|
| 2,964,677 | 12/1960 | Tucker et al. | 315/309 |
| 3,014,134 | 12/1961 | Bower | 315/155 |
| 3,246,189 | 4/1966 | Waymouth | 315/117 |
| 3,495,777 | 2/1970 | Evalds et al. | 315/158 |
| 3,531,684 | 9/1970 | Nuckolls | 315/155 |
| 3,539,861 | 11/1970 | Blackford | 315/118 |
| 3,657,455 | 4/1972 | Trice | 315/308 |
| 4,001,633 | 1/1977 | Tongeren et al. | 315/47 |
| 4,112,331 | 9/1978 | Verbeek et al. | 315/125 |
| 4,156,166 | 5/1979 | Shapiro | 315/308 |
| 4,170,744 | 10/1979 | Hansler | 315/90 |
| 4,207,501 | 6/1980 | Smallegan | 315/159 |
| 4,529,912 | 7/1985 | Northrup et al. | 315/117 |
| 4,533,853 | 8/1985 | Hammond et al. | 315/117 |
| 4,533,854 | 8/1985 | Northrup | 315/117 |
| 4,659,965 | 4/1987 | Bonazoli | 315/60 |
| 4,694,223 | 9/1987 | Campolo | 315/118 |

Primary Examiner—David K. Moore
Assistant Examiner—M. Powell
Attorney, Agent, or Firm—Vaden, Eickenroht Thompson & Boulware

[57] ABSTRACT

A temperature switch for HID lamp fixtures is provided to enable such lights to be operated at low temperatures on the order of minus forty degrees Celsius, or minus fifteen degrees Fahrenheit. In one embodiment, the switch is comprised of a thermistor circuit and a resistive photocell circuit. When the resistance of either the thermistor or the photocell exceeds the reference value, or when the combined resistance of thermistor and the photocell exceed that value, the HID lamp will be turned on. The lamp is thereby turned on when the ambient temperature becomes very cold, regardless of the amount of ambient light in order that the components of the light fixture may be heated internally for more reliable operation.

4 Claims, 3 Drawing Sheets

PHOTOCELL TEMPERATURE SWITCH FOR HIGH INTENSITY DISCHARGE LAMP FIXTURE

FIELD OF INVENTION

This invention relates to high intensity discharge light fixtures, and more particularly to temperature sensitive switches for use with such lights in cold climates or other low temperature applications.

BACKGROUND OF THE INVENTION

The use of high intensity discharge (HID) lamps has become increasingly prevalent for several reasons, including their higher output in lumens per watt than incandescent lights, resulting in lower operating costs. The reliability of HID lamp fixtures is another reason for the acceptance of such fixtures for a wide variety of commercial and consumer applications.

HID lights are increasingly being used in cold climates and other low temperature applications. Mercury vapor and high pressure sodium HID lights are typically suitable for temperatures down to minus 20 degrees Celsius, or minus 4 degrees Fahrenheit. Below that temperature, HID light fixtures typically exhibit one or more problems, including malfunction of the thermal photocell that is often used to turn the light on at dusk and off at dawn, and unreliable firing even if the photocell operated properly.

Temperatures in northern parts of the United States, in Canada, in other parts of the world, and in artificially controlled environments (e.g. storage freezers) often reach below the limits of such typical HID light fixtures.

It is therefore desirable to provide a means for reliably operating a HID light fixture at lower temperatures than is typically possible with existing HID light fixtures.

SUMMARY OF THE INVENTION

A temperature switch for HID light fixtures is provided to enable such lights to be operated at low temperatures on the order of minus forty degrees Celsius, or minus fifteen degrees Fahrenheit.

The switch is comprised of a device sensitive to the ambient light and a device sensitive to the ambient temperature. In one embodiment, the switch is comprised of a thermistor in series with a resistive photocell, both of which are a part of a Wheatstone bridge. In one embodiment, the thermistor and the photocell are interdependent so that when the combined resistance of the thermistor and the resistive photocell exceeds a reference value, the HID lamp will be turned on.

In another embodiment, the temperature sensitive device and the light sensitive device are independently connected so that each has its own, distinct set point. The set point for the light sensitive device is reached at dusk or when the ambient light diminishes; the light is then turned on. The set point for the temperature sensitive device is reached when the ambient temperature drops below its set point, at which point the light is also turned on. Each of these set points is independently variable to suit the climatic conditions in which the light fixture is installed.

In one embodiment, the resistance of the temperature sensitive device is inversely proportional to the ambient temperature. The resistance of the light sensitive device is inversely proportional to the amount of ambient light. The reference resistance is chosen so that the light may be turned on when the ambient temperature drops below a predetermined value, even if the light sensitive device senses that it is a bright, sunny day. In other words, the reference resistance is chosen so that the increased resistance across the temperature sensitive device due to the ambient low temperature is alone sufficient to turn on the light. Similarly, the reference resistance is chosen so that the increased resistance across the light sensitive device due to the low level of ambient light is alone sufficient to turn on the HID lamp.

In the embodiment in which the temperature sensitive device and the light sensitive device are interdependent, their combined resistances may also turn on the lamp when neither resistance alone is sufficient to turn on the lamp. The HID lamp will remain lit as long as these combined resistances exceed the reference resistance value.

The purpose of turning on the HID lamp when the ambient temperature is low is to keep the bulb and the light fixture components sufficiently heated so that the light may reliably operate when required, i.e., when the ambient light is low. The heat output of the bulb itself may be sufficient to keep the other components heated.

In one embodiment, the circuit also contains an overvoltage protector to protect the light fixture from damage due to high voltage conditions.

It is a feature of the present invention to provide a high intensity discharge lamp that is operable in low ambient temperatures.

It is another feature of the present invention to use the heat output of a high intensity discharge lamp to heat the components of the light fixture.

It is yet another feature of the present invention to sense the ambient temperature surrounding a HID light fixture and to turn on the HID lamp when the sensed temperature is below a predetermined value, regardless of the amount of ambient light present.

It is yet another feature of the present invention to provide a switch whose temperature and light set points are independent and variable depending upon the climatic conditions.

These and other features of the present invention will be obvious to those skilled in the art by reference to the drawing and the following detailed description.

IN THE DRAWINGS

DETAILED DESCRIPTION

Figure 1:
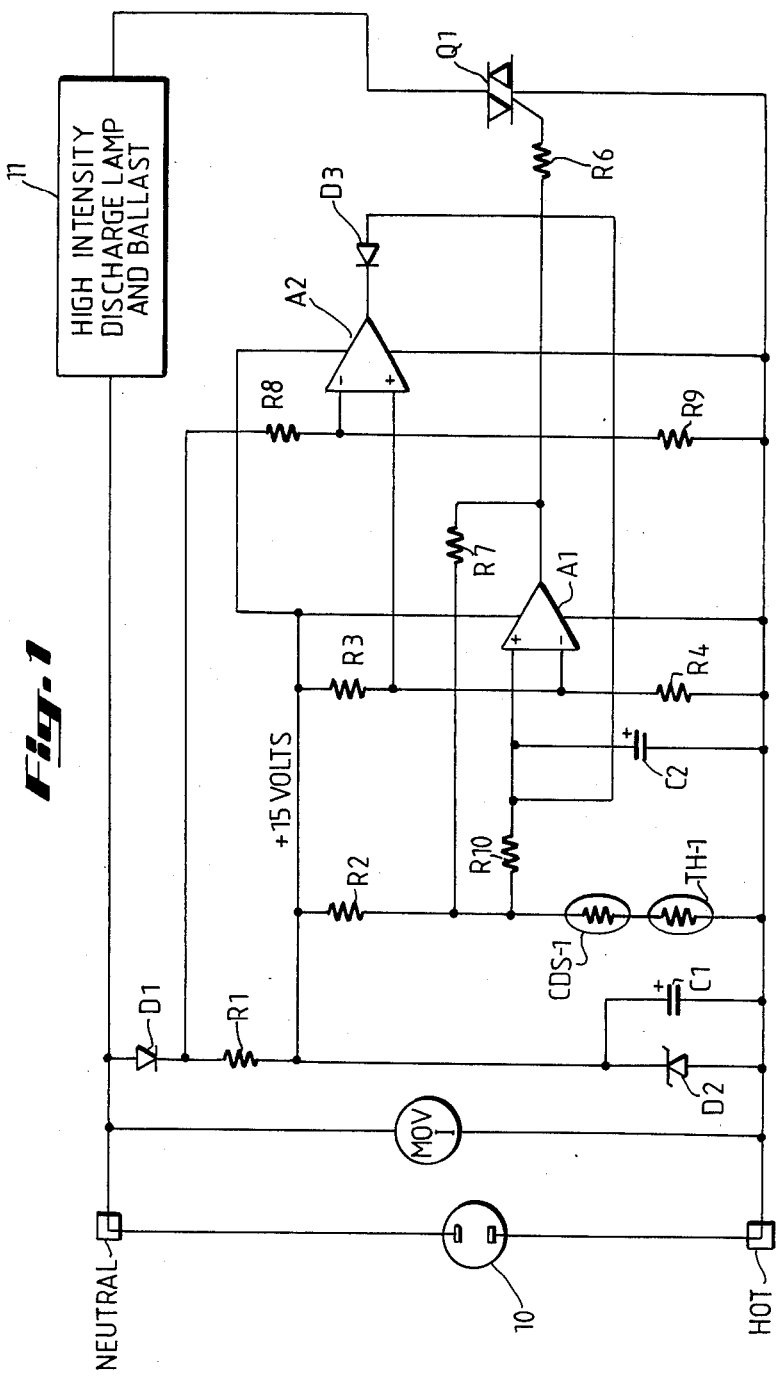
FIG. 1 is a schematic diagram of an embodiment in which the light sensitive device and the temperature sensitive device share a common set point.

Referring now to FIG. 1, AC power source 10 is a commercial AC supply such as 118 VAC 60 Hz, 240 VAC 60 Hz, or 220 VAC 50 Hz supply used to drive the lamp circuit 11. Lamp circuit 11 is typically comprised of a high intensity discharge lamp and a ballast for regulating the current flow to the lamp. However, a ballast may not be necessary.

MOV-1 is a spike protector for protecting the circuit against random, transient high voltage spikes that appear in the line current.

The switch circuit also includes a low voltage power supply comprised of diode D1, resistor R1, zener diode D2 and capacitor C1. These components comprise a half-wave rectified regulated power supply that provides, in one embodiment, 15 volts of direct current. This low voltage power supply provides power to the temperature switch circuit elements as shown in FIG. 1.

Resistors R2, R3, R4, and the series resistances of resistive photocell CDS-1 and thermistor TH-1, comprise a Wheatstone bridge. Although this embodiment is described as containing a photocell and a thermistor, it is readily apparent that other light sensitive and temperature sensitive devices or circuits could be used and still be within the scope of this invention.

Resistor R10 and capacitor C2 make up a three to six second time constant to the positive input of operational amplifier A1. The purpose of the time constant is to ensure that quick, transient changes in the light intensity sensed by photocell CDS-1 do not turn the HID lamp off.

Resistor R7 has the effect of providing a hysteresis value to the subcircuit comprised of the Wheatstone bridge and operational amplifier A1 by making minor adjustments to the set point or reference resistance value (e.g., 4000 ohms). This helps ensure decisive switching action of the photocell temperature switch.

The photocell temperature switch operates as follows. The junction of resistors R3 and R4 establishes a positive reference voltage at the negative input terminal of amplifier A1. In a preferred embodiment, this reference voltage corresponds to a resistance of 4000 ohms.

The positive input of amplifier A1 is primarily determined by the series resistances of photocell CDS-1 and thermistor TH-1.

If this reference voltage value is more positive than the voltage present at the positive input of amplifier A1, it is apparent that the combined series resistances of photocell CDS-1 and thermistor TH-1 are less than 4000 ohms. As discussed above, this condition indicates that the combination of the ambient light and ambient temperature is such that the HID lamp need not be operating.

When the reference voltage is more positive than the voltage present at the positive input terminal of amplifier A1, the output of amplifier A1 is near zero potential. This prevents triac Q1 from conducting, which in turn prevents power from AC source 10 from reaching lamp circuit 11. Thus, the HID lamp in lamp circuit 11 is off.

When the combined series resistances of photocell CDS-1 and thermistor TH-1 exceed 4000 ohms, the voltage at the positive input of amplifier A1 is a high positive potential than that present at the negative input of amplifier A1. The output of amplifier A1 is then approximately 80 percent of the output of the low voltage power supply, or a position 12 VDC.

This positive output of amplifier A1 causes current to flow through resistor R6 and the gate of triac Q1. Although this specification describes switches Q1 and Q2 (FIG. 3) as being triacs, it is apparent that many other types of switches may be used and still be within the scope of this invention.

Triac Q1 then goes into conduction, causing 118 VAC from AC source 10 to be applied to lamp circuit 11. The ballast and HID lamp will then be operated in their customary manners, and the HID lamp will be turned on.

Triac Q1 will stay in condition, and the HID lamp will remain lit, as long as the combined series resistances of photocell CDS-1 and thermistor TH-1 exceed the reference value, or 4000 ohms.

It is apparent that the present invention may be used with a wide variety of HID lamps. It is also apparent that no particular type of ballast is required to be used with the present invention, and in fact, a ballast may not be required at all.

Other embodiments of the photocell temperature switch will be apparent to those skilled in the art. In particular, different means may be used to sense the ambient temperature. These are also within the scope of the present invention.

The preferred embodiment depicted in FIG. 1 also includes an overvoltage protection subcircuit, consisting of operational amplifier A2, diode D3, and resistors R8 and R9.

Amplifier A2 has a reference voltage applied to its positive input that is derived from resistors R3 and R4. The output of amplifier A2 is approximately 80 percent of the low voltage power supply, or 12 VDC in the embodiment described herein.

The overvoltage protection subcircuit operates as follows. Resistors R8 and R9 sense the positive amplitude of the line voltage from power source 10. When the sensed line voltage exceeds 135 VAC, root-mean-square (RMS) or a peak voltage of 190 VAC, the negative input of amplifier A2 becomes positive with respect to the positive input of amplifier A2. The output of amplifier A2 rapidly switches to a near zero output voltage.

If the HID lamp is on, diode D3 discharges capacitor C2. This turns off triac Q1 which causes the HID lamp to turn off.

Since capacitor C2 cannot rapidly recharge, this action of amplifier A2 and diode D3 will keep the HID lamp off while the line current is above 135 VAC, RMS.

Figure 2:
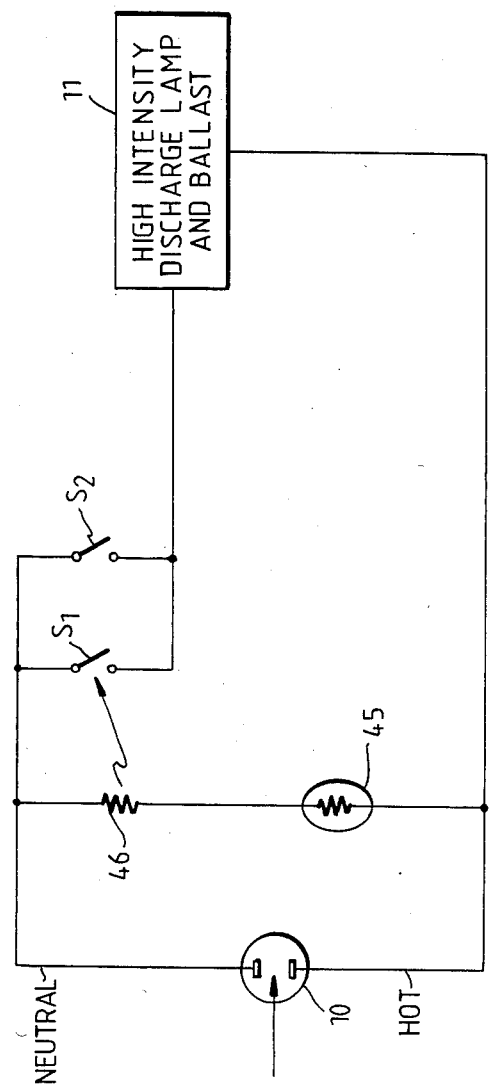
FIG. 2 is a schematic diagram of an embodiment using a light sensitive device, a resistor, and two temperature sensitive switches.

FIG. 2 depicts another embodiment of the present invention. The circuit depicted in FIG. 2 includes a photocell 45, a heater resistor 46, a first temperature sensitive switch S1, a second temperature sensitive switch S2, a power source 10, and a HID lamp and ballast circuit 11. In a preferred embodiment, switches S1 and S2 could be bimetal switches. The use of other temperature sensitive switches, devices or circuitry is still within the scope of this invention. Similarly, the use of other light sensitive devices other than a photocell is still within the scope of this invention.

During daylight hours, heat from resistor 46 keeps switch S1 open. As the sun goes down, the resistance in photocell 45 increases, thereby reducing the heat in resistor 46. The decrease in heat output of resistor 46 closes switch S1, and power is provided to the lamp from source 10. Lamp 10 then ignites.

A second bimetal switch S2 closes when the ambient temperature drops below a predetermined value. The closing of switch S2 causes power to be provided to the lamp regardless of the amount of ambient light present and regardless as to whether switch S1 is open.

Figure 3:
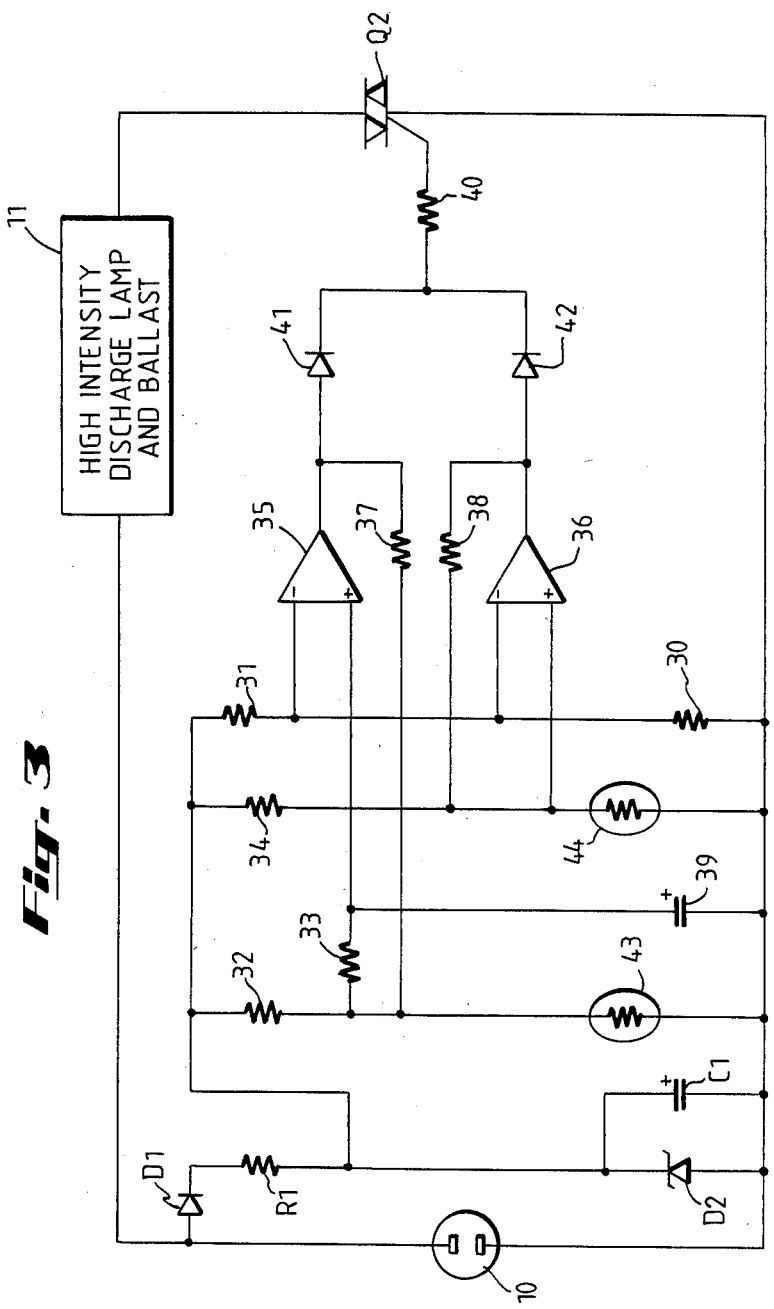
FIG. 3 is a schematic diagram of an embodiment in which the set points of the light sensitive device and the temperature sensitive device are independent.

FIG. 3 depicts an embodiment of the present invention wherein there is independent control of the set points for light and temperature sensitivity.

Referring now to FIG. 3, the circuit uses two comparator operational amplifiers 35 and 36. Amplifiers 35 and 36 use a common reference voltage determined by resistors 30 and 31. Resistors 30 and 31 form a voltage divider that places a reference voltage on the negative inputs of amplifiers 35 and 36.

Resistor 32 and photocell 43 are connected to the positive input of amplifier 35 via a timing network comprised of resistor 33 and capacitor 39. This timing network delays the action of amplifier 35 so that the lamp is not turned on when the ambient light temporarily decreases, as when clouds pass overhead.

The output of amplifier 35 becomes positive when the resistance of photocell 43 in increased to a reference level as controlled by the reference or set point resistor 32.

When the output of amplifier 35 goes positive, triac Q2 fires thereby providing power to the HID lamp/ballast 11. This turns on the lamp.

In a similar manner, amplifier 36 has a common reference to its positive input, and has a thermistor 44 and a resistor 34 connected to its positive input. As the ambient temperature drops, the resistance of thermistor 44 increases, until it reaches the reference or set point determined in part by resistor 34. This causes the output of amplifier 36 to go positive, which fires triac Q2 and causes the lamp to be turned on.

From the above description, it is apparent that the actions of amplifiers 35 and 36 are totally independent of each other. Thus, the lamp is turned on based upon the amount of ambient light present, regardless of the ambient temperature. Similarly, the lamp is turned on based upon the ambient temperature regardless of the amount of ambient light present. Unlike the embodiment depicted and described in connection with FIG. 1, the embodiment depicted and described in connection with FIG. 3 does not use any common set point; there is no combination of the resistances or voltages from the photocell and the thermistor to decide whether the reference value or set point has been met. There is no interaction between the photocell and the thermistor that determines whether the lamp is ignited.

Referring again to FIG. 3, each of the set points is independently alterable to suit varying climatic conditions or for design choice. The reference value or set point that determines when the lamp is turned on due to the presence of ambient light may be altered by changing the value of resistor 32. Similarly, the reference value or set point that determines when the lamp is turned on due to the ambient temperature may be independently altered by changing the value of resistor 34.

Although the above description with respect to FIG. 3 refers to the use of a photocell, it is apparent that other light sensitive devices or circuits could be used and still be within the scope of the present invention. Similarly, other temperature sensitive devices or circuits could be used in place of the thermistor and still be within the scope of the present invention.

What is claimed is:

1. A switch circuit for high intensity discharge lamps, comprising:
   a high intensity discharge lamp;
   a first sensing means for sensing the ambient light and for outputting a first signal representative of the sensed ambient light;
   a second sensing means for sensing the ambient temperature and for outputting a second signal representative of the sensed ambient temperature;
   a first comparator means for comparing said first signal with a first reference value and for outputting a third signal;
   a second comparator means for comparing said second signal with a second reference value and for outputting a fourth signal; and
   switch means, responsive to both said third signal and said fourth signal, for supplying power to said lamp.

2. The switch circuit of claim 1 wherein: said first sensing means is a photocell.

3. The switch circuit of claim 1 wherein: said second sensing means is a thermistor.

4. A switch circuit for high intensity discharge lamps, comprising:
   a high intensity discharge lamp;
   a resistor that outputs heat;
   means for sensing the ambient light, said means being interconnected with said resistor;
   a first bimetal switch that is responsive to the heat output of said resistor for supplying power to said lamp; and
   a second bimetal switch that is responsive to the ambient temperature for supplying power to said lamp.

* * * * *